July 24, 1951  J. CRESPO Y GARCIA  2,561,784
METHOD FOR CANNING AND PRESERVING FRUIT AND VEGETABLE JUICES
Filed Feb. 18, 1950  2 Sheets-Sheet 1

INVENTOR.
Joaquin Crespo y Garcia
BY

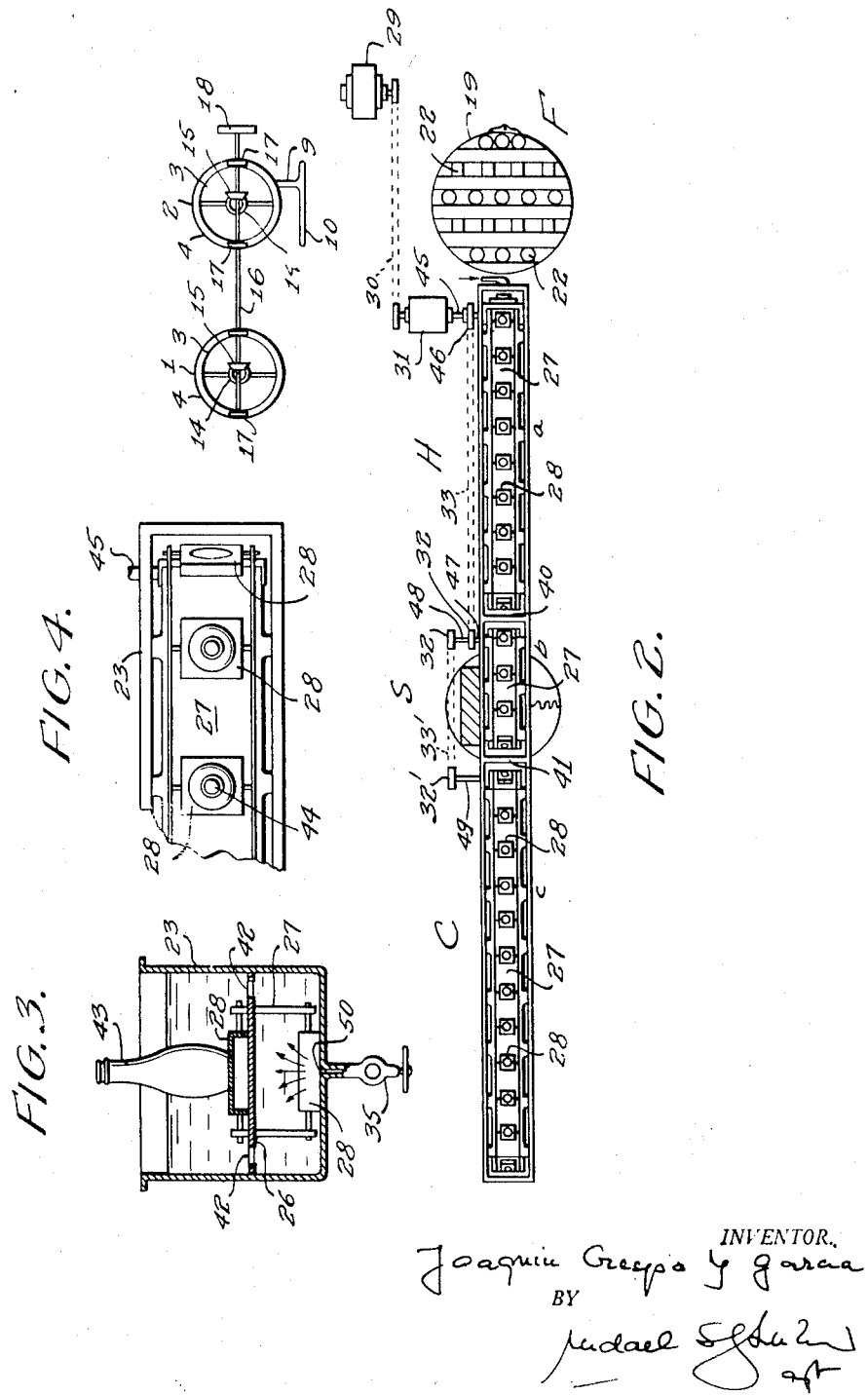

Patented July 24, 1951

2,561,784

UNITED STATES PATENT OFFICE 2,561,784

METHOD FOR CANNING AND PRESERVING FRUIT AND VEGETABLE JUICES

Joaquin Crespo y Garcia, Mexico City, Mexico

Application February 18, 1950, Serial No. 145,066
In Mexico May 24, 1945

8 Claims. (Cl. 99—155)

The present invention relates to a method and a device for canning and preserving fruit and vegetables.

This application is a continuation-in-part of my co-pending application Serial No. 671,572, filed May 22, 1946, now abandoned, for Bio-Physical Process for the Conservation and Preservation of Bottled Fermentable Liquids and Mechanism for Carrying Out Same.

It is an object of the present invention to avoid the use of artificial preservatives or chemical ingredients to be added to the juice except sugar and artificial coloring.

It is a further object of the present invention to allow the juices to be packed either in a state of fermentation or without fermentation. In the first case the fermentation is preserved in the condition which it has at the time of packing, any secondary fermentations being stopped.

It is another object of the present invention to provide a continuous process of canning juices in glass jars or metal cans.

The new process is intended for all kinds of fermentable or not fermentable juices such as the juices of grapes, strawberries, prunes, cherries, grapefruit, limes, lemons, oranges, tomatoes, turnips, beets, cabbages, etc.

A method according to the present invention comprises the steps of pre-heating the juice prior to canning to a temperature between 30 and 40° C., maintaining the temperature of the juice at 30 to 40° C., for a period of about 10 to 20 minutes, pre-heating the canning receptacles to a temperature between 30 and 40° C., filling the pre-heated juice into the pre-heated canning receptacles, raising the temperature of the juice and the receptacle containing same to 55 to 75° C., maintaining the temperature of the juice and the receptacles containing the same at 55 to 75° C., for a period of about 10 to 20 minutes, sealing the receptacles, and gradually lowering the temperature of the receptacles after sealing to slightly above room temperature.

In a preferred embodiment of the present invention the temperature of the receptacles is gradually lowered after sealing to 20 to 25° C., and maintained at that level for about 10 to 15 minutes.

A method for canning and preserving tomato juice comprises the steps of pre-heating the tomato juice to a temperature of 35 to 40° C., maintaining the temperature of the tomato juice at 35 to 40° C. for about 10 minutes, pre-heating canning receptacles to a temperature of 35 to 40° C., filling the pre-heated tomato juice into the pre-heated receptacles, raising the temperature of the tomato juice and the receptacles containing the same to about 65 to 70° C., maintaining the temperature of the tomato juice and the receptacles containing the same at 65 to 70° C. for about 15 minutes, sealing the receptacles, gradually cooling the receptacles after sealing to a temperature of 20 to 25° C., and maintaining the temperature of the sealed receptacles at 20 to 25° C. for about 10 to 15 minutes.

If the tomato juice has the pH value of 4 and a density of 1040 centimeters per liter the method according to the present invention comprises the steps of pre-heating the tomato juice substantially to 35° C., maintaining the temperature of the tomato juice at 35° C. for about 10 minutes, pre-heating canning receptacles to substantially 35° C., filling the pre-heated tomato juice into the pre-heated receptacles, raising the temperature of the tomato juice and the receptacles containing same to substantially 70° C., maintaining the temperature of the tomato juice and the receptacles containing same at substantially 70° C. for about 15 minutes, sealing the receptacles, and gradually cooling the receptacles after sealing to substantially 25° C., and maintaining the temperature of the sealed receptacle at substantially 25° C. for about 15 minutes.

If the pH value is 5 and the density 1,060 cu. centimeters per liter the pre-heating temperature is substantially 40° C. and maintained for about 10 minutes, the heating temperature substantially 65°, and the cooling temperature substantially 20° C. which is maintained for about 10 minutes.

For lime juice with the pH value of 6 and a density of 1,065 cu. centimeters per liter, the pre-heating temperature is substantially 30° C. and maintained for about 10 minutes, the heating temperature substantially 55° C., and is maintained for about 20 minutes, and the cooling temperature is about 20° C. which is maintained for about 20 minutes.

For grapefruit juice with a pH value of 4.4 and a density of 1,070 cu. centimeters per liter, the pre-heating temperature is substantially 40° C. which is maintained for about 15 minutes, the heating temperature is substantially 67° C. which is maintained for about 15 minutes, and the cooling temperature amounts to substantially 20° C. and is maintained for about 10 minutes.

For orange juice with a pH value of 4.5 and a density of 1,060 cu. centimeters per liter the pre-heating temperature amounts to substantially 40° C. and is maintained for about 15 minutes, the heating temperature is substantially 70° C. and is maintained for about 15 minutes, and the cooling temperature is substantially 20° C. and is maintained for about 10 minutes. Generally the temperatures to be applied vary within the limits given above with the pH value and the density of the juice.

A device for canning and preserving fruit and vegetable juices according to the present invention comprises in combination a pre-heating station for the juice, a filling station wherein the juice is filled into receptacles, the filling station being operably connected to the pre-heating station, a heating station for the open receptacles filled with juice, the heating station following immediately the filling station, a sealing station following immediately the heating station, the sealing station serving for the sealing of the receptacles, and a cooling station immediately following the sealing station, the cooling station including means for gradually cooling the receptacles to and maintaining the receptacles at a temperature slightly above room temperature.

Preferably the pre-heating station includes a steam-heated container for the juice and stirrers arranged in the container.

According to a preferred embodiment of the present invention each of the heating and cooling stations includes a channel adapted to be partly filled with water, an endless conveyer arranged in the channel and adapted to convey the receptacles from one end of the channel to the other, and means for adding steam to the water in the channel so as to maintain the water in the channel at the required temperature.

The pH value and the density of the juices are determined according to conventional methods using well-known devices such as a pycnometer for determination of the densities and a colorimeter for determination of the pH value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a plan view of the device shown in Fig. 1, the top part being shifted in Fig. 2 for the sake of clearness;

Fig. 3 is a section along the line A—A of Fig. 1 at an enlarged scale; and

Fig. 4 is a plan view of a part of Fig. 2 at an enlarged scale.

Figure 1:
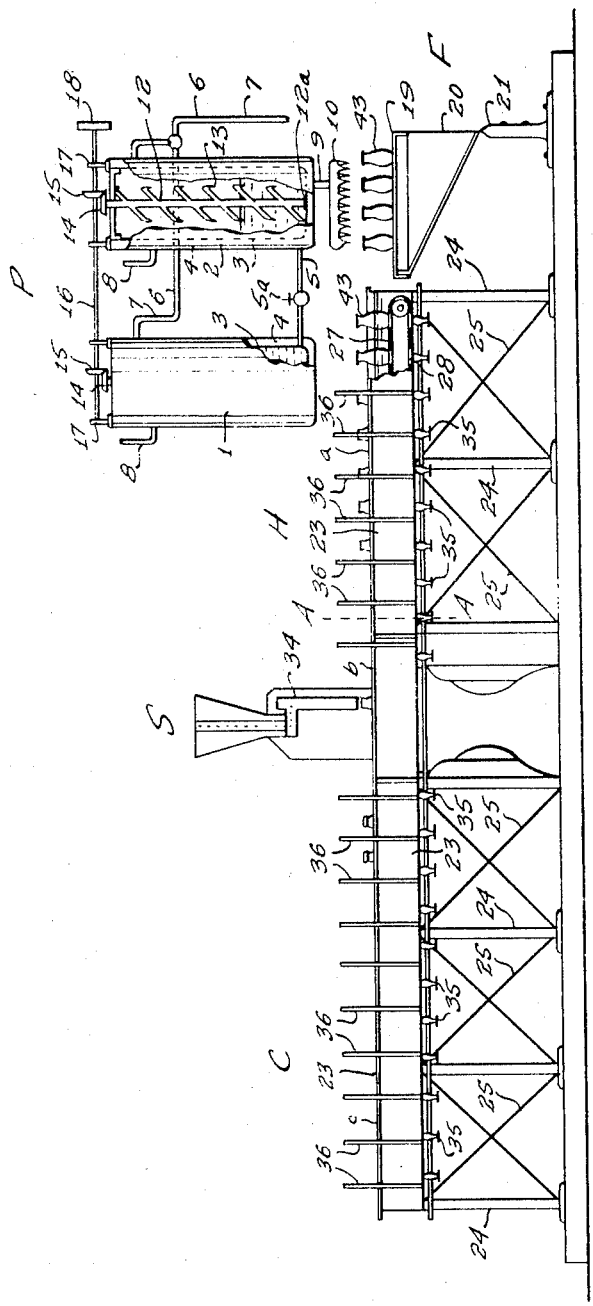
Fig. 1 is a sectional side elevation of a device for carrying out a method according to the present invention.

Referring now to the drawings and first to Figs. 1 and 2, the device consists of a pre-heating station P, a filling station F, a heating station H, a sealing station S and a cooling station C.

The pre-heating station P comprises two containers 1 and 2, each having a double walled chamber 3 surrounded by a hollow chamber 4 formed between the double walls of chamber 3. The two chambers 3 are joined near their bottoms by a tube 5 provided with a valve 5a. The surrounding chambers 4 are each connected near their upper ends with a tube 6 for the supply of hot water or steam. The tube 6 is provided with a valve 7 for controlling the temperature in the containers 1 and 2. Thermometers or thermostats 8 are provided for measuring or controlling the temperature of the containers. Container 2 is provided with an exit tube 9 for the juice which ends in a T-shaped distributor tube 10 provided with valves 11 for the exit of the juice.

Inside each of the containers 1 and 2 a stem 12 is arranged along the axes thereof which is provided with inclined stirrers 13 which form a hook on one side whereas on the other they are straight. The stems 12 and the stirrers 13 are preferably made hollow and have perforations in their bodies. The lower end of the stems 12 is set in ball bearings 12a arranged in the bottom walls of the containers 1 and 2. The upper ends of the stems 12 carry bevel pinions 14 outside the containers which mesh with bevel pinions 15 secured to a horizontal shaft 16 supported by bearings 17 provided on the top of the containers 1 and 2. The end of the shaft 16 carries a pulley 18 which is driven by a belt (not shown) from an electromotor, such as 29.

A revolving table 19 forming part of the filling station F, is arranged underneath the tube 10 and supported by a tubular member 20 the lower end of which rests on a base 21 provided with screws for permitting setting of the table 19 in any angular position as desired. The table 19 is provided with grooves or recesses 22 of different geometrical shapes for placing in them jars, bottles or metal cans for the juice.

The heating station H, the sealing station S, and the cooling station C are formed by a unitary structure comprising uprights 24 and inclined supports 25 carrying at their upper ends a water-filled channel 23 preferably of U-shaped cross-section and subdivided into three parts, a, b, c (Figs. 1 and 2) corresponding to the heating, sealing, and cooling stations, H, S, C, respectively. As will be seen from the drawing, part b of the channel 23 is much shorter than parts a and b and the part c is a little longer than part a. The parts are separated from each other by partitions 40 and 41 (Fig. 2). Each part of the channel 23 is subdivided by a horizontal partition 26 (Fig. 3) having apertures 42 distributed over their entire lengths for the circulation of the liquid.

In each of the sections a, b, c, of the channel 23 is arranged an endless conveyer belt 27 provided with holding members 28 for the bottles 43, jars or metal cans. The holding members 28 are preferably shaped as squares and provided with centering holes 44 (Fig. 4).

An electric motor 29 (Fig. 2) drives a chain 30 driving a speed changer 31 provided with an output shaft 45 carrying a pulley 46 connected by a belt 33 to a pulley 47. The shaft 45 is directly connected to the drive of the endless conveyer 27 in portion a of the channel 23. Pulley 47 is connected to a shaft 48 driving the endless belt 27 in part b of the channel 23 and carries a pulley 32 for transfer of the motion to a pulley 32' by means of a belt 33'. Pulley 32' is secured to a shaft 49 driving the endless conveyer 27 in part c of the channel 23. Thus it is seen that the drives for all conveyer belts are derived from motor 29 which drives also by a belt or chain (not shown) the pulley 18 secured to the shaft 16 on the containers 1 and 2.

Above section b of channel 23 a capping of sealing machine 34 is arranged which is of conventional design. Valves 35 are arranged underneath the channel 23 at spaced places along the entire length of the channel. The valves 35 open through end apertures 50 in the bottom part of the channel 23 and serve for controlling and maintaining the temperatures of the receptacles 43 by adding steam to the water in the channel 23. It is to be understood that the steam is admitted so as to raise the temperature in section a, to keep it at the elevated level in section b, to lower it gradually in section c, and maintain it for the times specified above. Thermometers or thermostats 36 (Fig. 1) are provided along the channel 23 for measuring and/or controlling the temperatures of the water.

The operation of this device is as follows:

The juices are introduced into the chambers 3 of the containers 1 and 2 communicating with each other by the tube 5. Hot water or steam is allowed to enter the hollow wall chambers 4 by means of the tube 6 and circulates in the chambers 4 pre-heating the juice contained in the chamber 3 and maintaining it for the specified time at this temperature. The temperature is preferably between 30 and 40° C. and is maintained for a time of 10 to 20 minutes as specified above. The stirrers 13 are set into motion during the pre-heating and continuously agitate the juices in the containers gently without producing any turbulence with the object of heating the juice slowly and thoroughly so that it keeps a uniform density, at the same time avoiding any sedimentation in the juice.

The recipients 43 are pre-heated in the meantime and placed on the revolving table 19. The juice is filled into the receptacles 43 by opening the valves 11 of the distributing tube 10. When the recipients 43 are filled they are transferred by a conventional device not shown in the drawings, to the endless belt 27 in the first section a of channel 23 which moves along the channel which is heated through the valves 35 so that the temperature of the receptacles and the juice is raised to 55 to 75° C. where it is maintained for about 10 to 20 minutes.

When the bottles have traversed the section a they are transferred to the endless belt in section b by a conventional apparatus not shown in the drawings and pass the capping of sealing machine 34 where they are sealed.

After traversing section b of the channel 23 the recipients 43 are transferred to the last section c of the channel by a conventional apparatus not shown in the drawings. In this section the temperature of the sealed receptacles is gradually lowered to a temperature slightly above room temperature, for instance 20 to 25° C. at which the receptacles are maintained for about 10 to 15 minutes.

It will be understood that each of the elements described above, or two or more together, may also find a useful application in other types of methods for canning and preserving fruit and vegetable juices differing from the types described above.

While I have illustrated and described the invention as embodied in a device for canning and preserving fruit and vegetable juices, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A method of canning and preserving fruit and vegetable juices comprising the steps of pre-heating the juice prior to canning to a temperature between about 30 and 40° C.; maintaining the temperature of the juice at about 30 to 40° C. for a period of about 10 to 20 minutes; pre-heating the canning receptacles to a temperature between about 30 and 40° C.; filling the pre-heated juice into the pre-heated canning receptacles; raising the temperature of the juice and the receptacles containing same to about 55 to 75° C.; maintaining the temperature of the juice and the receptacles containing the same at 55 to 75° C. for a period of about 10 to 20 minutes; sealing the receptacles; gradually lowering the temperature of the receptacles after sealing to a temperature of about 20 to 25° C. by subjecting said receptacles to gradually reduced temperatures; and maintaining the temperature of the sealed receptacles at about 20 to 25° C. for about 10 to 15 minutes.

2. A method of canning and preserving tomato juice comprising the steps of pre-heating the tomato juice to a temperature of about 35 to 40° C.; maintaining the temperature of the tomato juice at about 35 to 40° C. for about 10 minutes; pre-heating canning receptacles to a temperature of about 35 to 40° C.; filling the pre-heated tomato juice into the pre-heated receptacles; raising the temperature of the tomato juice and the receptacles containing the same to about 65 to 70° C.; maintaining the temperature of the tomato juice and the receptacles containing the same at about 65 to 70° C. for about 15 minutes; sealing the receptacles; gradually cooling the receptacles after sealing to a temperature of about 20 to 25° C. by subjecting said receptacles to gradually reduced temperatures; and maintaining the temperature of the sealed receptacles at about 20 to 25° C. for about 10 to 15 minutes.

3. A method of canning and preserving tomato juice having a pH-value of 4 and a density of 1040 cubic centimeters per liter comprising the steps of pre-heating the tomato juice substantially to 35° C.; maintaining the temperature of the tomato juice at about 35° C. for about 10 minutes; pre-heating canning receptacles to substantially 35° C.; filling the pre-heated tomato juice into the pre-heated receptacles; raising the temperature of the tomato juice and the receptacles containing same to substantially 70° C.; maintaining the temperature of the tomato juice and the receptacles containing same at substantially 70° C. for about 15 minutes; sealing the receptacles; and gradually cooling the receptacles after sealing to substantially 25° C. by subjecting said receptacles to gradually reduced temperatures; and maintaining the temperature of the sealed receptacle at substantially 25° C. for about 15 minutes.

4. A method of canning and preserving tomato juice having a pH-value of 5 and a density of 1060 cubic centimeters per liter comprising the steps of pre-heating the tomato juice substantially to 40° C.; maintaining the temperature of the tomato juice at about 40° C. for about 10 minutes; pre-heating canning receptacles to substantially 40° C.; filling the pre-heated tomato juice into the pre-heated receptacles; raising the temperature of the tomato juice and the receptacles containing same to substantially 65° C.; maintaining the temperature of the tomato juice and the receptacles containing same at 65° C. for about 15 minutes; sealing the receptacles; and gradually cooling the receptacles after sealing to substantially 20° C. by subjecting said receptacles to gradually reduced temperatures; and maintaining the temperature of the sealed receptacle at substantially 20° C. for about 10 minutes.

5. A method of canning and preserving lime juice having a pH-value of 6 and a density of 1065 cubic centimeters per liter comprising the steps of pre-heating the lime juice substantially to 30° C.; maintaining the temperature of the lime juice at about 30° C. for about 10 minutes; pre-heating canning receptacles to substantially 30° C.; filling the pre-heated lime juice into the pre-heated receptacles; raising the temperature of the lime juice and the receptacles containing same to substantially 55° C.; maintaining the temperature of the lime juice and the receptacles containing same at substantially 55° C. for about 20 minutes; sealing the receptacles; and gradually cooling the receptacles after sealing to substantially 20° C. by subjecting said receptacles to gradually reduced temperatures; and maintaining the temperature of the sealed receptacle at substantially 20° C. for about 10 minutes.

6. A method of canning and preserving grapefruit juice having a pH-value of 4.4 and a density of 1070 cubic centimeters per liter comprising the steps of pre-heating the grapefruit juice substantially to 40° C.; maintaining the temperature of the grapefruit juice at about 40° C. for about 15 minutes; pre-heating canning receptacles to substantially 40° C.; filling the pre-heated grapefruit juice into the pre-heated receptacles; raising the temperature of the grapefruit juice and the receptacles containing same to substantially 67° C.; maintaining the temperature of the grapefruit juice and the receptacles containing same at substantially 67° C. for about 15 minutes; sealing the receptacles; and gradually cooling the receptacles after sealing to substantially 20° C. by subjecting said receptacles to gradually reduced temperatures; and maintaining the temperature of the sealed receptacle at substantially 20° C. for about 10 minutes.

7. A method of canning and preserving orange juice having a pH-value of 4.5 and a density of 1060 cubic centimeters per liter comprising the steps of pre-heating the orange juice substantially to 40° C.; maintaining the temperature of the orange juice at about 40° C. for about 15 minutes; pre-heating canning receptacles to substantially 40° C.; filling the pre-heated orange juice into the pre-heated receptacles; raising the temperature of the orange juice and the receptacles containing same to substantially 70° C.; maintaining the temperature of the orange juice and the receptacles containing same at substantially 70° C. for about 15 minutes; sealing the receptacles; and gradually cooling the receptacles after sealing to substantially 20° C. by subjecting said receptacles to gradually reduced temperatures; and maintaining the temperature of the sealed receptacle at substantially 20° C. for about 10 minutes.

8. A method of canning and preserving fruit and vegetable juices comprising the steps of pre-heating the juice prior to canning to a temperature between about 30 and 40° C.; maintaining the temperature of the juice at about 30 to 40° C. for a period of about 10 to 20 minutes; filling the pre-heated juice into canning receptacles; raising the temperature of the juice and the receptacle containing same to about 55 to 75° C.; maintaining the temperature of the juice and the receptacles containing the same at about 55 to 75° C. for a period of about 10 to 20 minutes; sealing the receptacles; and gradually lowering the temperature of the receptacles after sealing to about 20° to 25° C. by subjecting said receptacles to gradually reduced temperatures.

JOAQUIN CRESPO Y GARCIA.

REFERENCES CITED

The following references are of record in the file of this patent:

UNITED STATES PATENTS

| Number | Name | Date |
| --- | --- | --- |
| 1,790,117 | Stassano | Jan. 17, 1931 |
| 2,189,774 | Blair | Feb. 13, 1940 |
| 2,239,008 | Loetscher | Apr. 22, 1941 |
| 2,372,239 | Whitaker | Mar. 7, 1945 |

OTHER REFERENCES

A Complete Course in Canning, 5th ed., 1924, pages 41 to 45.